United States Patent
Bruno et al.

(12)

(10) Patent No.: US 6,317,661 B1
(45) Date of Patent: Nov. 13, 2001

(54) ARGUMENT OF PERIGEE CORRECTION WITH LONGITUDE CONTROL FOR INCLINED, ECCENTRIC, GEOSYNCHRONOUS SATELLITES

(75) Inventors: Michael J. Bruno, Fremont; Brian Kemper, Sunnyvale, both of CA (US); Sherry Pervan, Clarendon Hills, IL (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 09/588,858

(22) Filed: Jun. 6, 2000

(51) Int. Cl.$^7$ ....................................... B64G 1/10
(52) U.S. Cl. ................. 701/13; 244/158 R; 244/164; 455/12
(58) Field of Search ................. 701/13, 3, 4; 244/158 R, 244/164, 169, 176, 226; 455/12.1, 13.1, 13.2, 13.3

(56) References Cited

U.S. PATENT DOCUMENTS 5,855,341 * 1/1999 Aoki et al. ......................... 244/176
6,019,318 * 2/2000 Cellier et al. .................... 244/158 R
6,089,507 * 7/2000 Parvez et al. .................... 244/158 R

* cited by examiner

*Primary Examiner*—William A. Cuchlinski, Jr.
*Assistant Examiner*—Marthe Marc-Coleman
(74) *Attorney, Agent, or Firm*—Kenneth W. Float

(57) ABSTRACT

A method of controlling the orbit of an inclined, eccentric geosynchronous satellite by maintaining its perigee location while simultaneously preventing a reference point on the orbit from moving too far relative to a normal position over the Earth. Doing this changes the semimajor axis of the orbit, which when perturbed away from the geosynchronous value, creates a drift rate relative to the Earth. To correct the argument of perigee and maintain the prescribed tolerance on ground track position, multiple maneuvers must be performed to control the drift rate. The relationship between maximum allowable velocity change and time between maneuvers is defined by the required correction to the argument of perigee and the allowable motion of the reference point.

24 Claims, 3 Drawing Sheets

Fig. 2

Table 3

STATIONKEEPING MANEUVER SEQUENCE

| DATE (Y/M/D) | TIME | IN-PLANE ΔV (m/s) | | A (KM) | E | INC (°) | ARG PER (°) | RAAN (°) | APOGEE LONG (°E) | TRUE ANOM (°) |
|---|---|---|---|---|---|---|---|---|---|---|
| 2/2/28 | 21:06:00 | -9.557 | before | 42166.95 | 0.274312 | 63.399 | 267.511 | 157.189 | 263.159 | 288.942 |
| | | | after | 41872.55 | 0.271755 | 63.399 | 268.653 | 157.189 | 264.599 | 287.801 |
| 2/3/01 | 6:06:00 | 12.238 | before | 41871.16 | 0.271730 | 63.398 | 268.664 | 157.184 | 265.044 | 121.559 |
| | | | after | 42172.96 | 0.268667 | 63.398 | 270.184 | 157.184 | 266.988 | 120.039 |

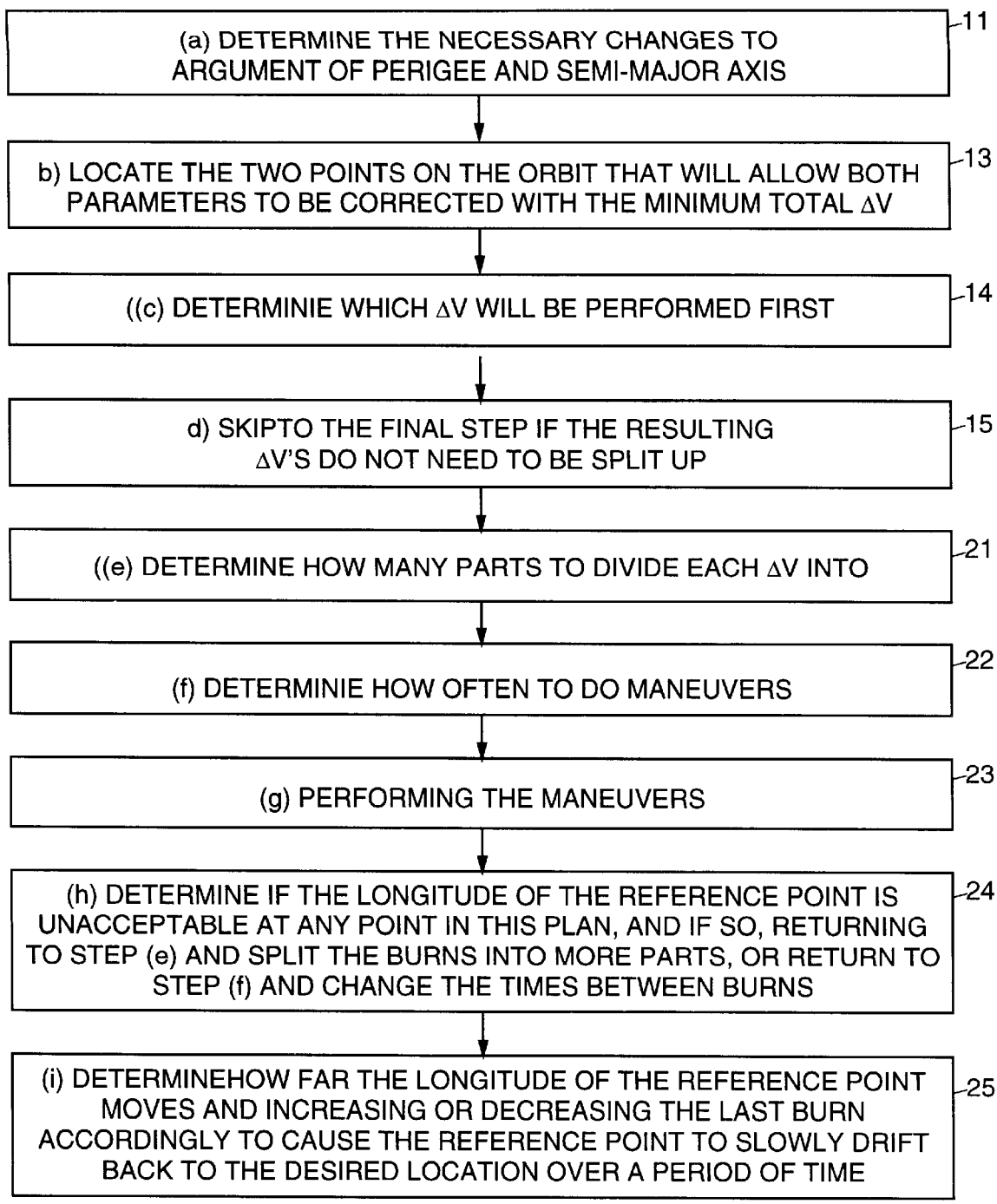

ARGUMENT OF PERIGEE CORRECTION WITH LONGITUDE CONTROL FOR INCLINED, ECCENTRIC, GEOSYNCHRONOUS SATELLITES

BACKGROUND

The present invention relates generally to satellites, and more particularly, to a methods for controlling the orbit of an inclined, eccentric, geosynchronously orbiting satellite.

The assignee of the present invention manufactures and deploys communication satellites that orbit the Earth in geosynchronous orbit. In particular, certain satellites are to be located in inclined, eccentric geosynchronous orbits.

More particularly, the satellites must maintain their orbits within a certain tolerance in order to maintain constellation integrity. The stationkeeping strategy for the satellites requires that no maneuvers be performed in the operational zone while yaw steering is being performed, because due to the rotating s/c body, the thrusters are not properly aligned with the desired thrust vector.

In order to meet this constraint, all the major stationkeeping maneuvers must take place in the two periods per year coinciding with orbit normal attitude operations. During these periods, all required stationkeeping maneuvers must be performed while observing the primary and derived requirements.

It would therefore be desirable to have methods that provides the ability to controlling the orbit of such an inclined, eccentric geosynchronously orbiting satellite. Accordingly, it is an objective of the present invention to provide for improved methods for controlling the orbit of an inclined, eccentric, geosynchronously orbiting satellite.

SUMMARY OF THE INVENTION

To accomplish the above and other objectives, the present invention provides for methods that control the orbit of an inclined, eccentric geosynchronous satellite by maintaining its perigee location while simultaneously preventing a reference point on the orbit from moving too far relative to a normal position over the Earth. Doing this also changes the semimajor axis of the orbit, which when perturbed away from the geosynchronous value, creates a drift rate relative to the Earth.

To correct the argument of perigee and maintain the prescribed tolerance on ground track position, several maneuvers must be performed to control the drift rate. The relationship between maximum allowable velocity change and time between maneuvers is defined by the required correction to the argument of perigee and the allowable motion of the reference point.

A first exemplary method comprises the following steps. An estimate of the current orbit parameters is determined. The desired change to the orbit is determined. N points on the orbit are located which allow the desired orbit correction to be achieved. The velocity changes to be performed at each of the N points which achieve the orbit correction is determined. If the velocity changes cause the longitude deadband to be exceeded, the method 10 further comprises the step of increasing the value of N and repeating the above steps.

In the method, the orbit has a period of substantially one day, and the orbit has substantially repeating ground track. The reference point may be the sub-satellite longitude at the instant the satellite is at any given true anomaly between 0° and 360° (e.g., perigee or apogee). The reference point may also be a sub-satellite longitude at the instant the satellite is at any given argument of latitude between 0° and 360° (e.g., ascending node). The number of orbits allowed between the two maneuvers in a given pair may be selectable (which impacts the allowable velocity change). The orbit inclination is preferably greater than 7 degrees.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 2 is a table (Table 3) that illustrates an example of a stationkeeping maneuver sequence without consideration for apogee longitude; and FIGS. 3 and 4 are flow charts that illustrate exemplary methods in accordance with the principles of the present invention.

DETAILED DESCRIPTION

Figure 1:
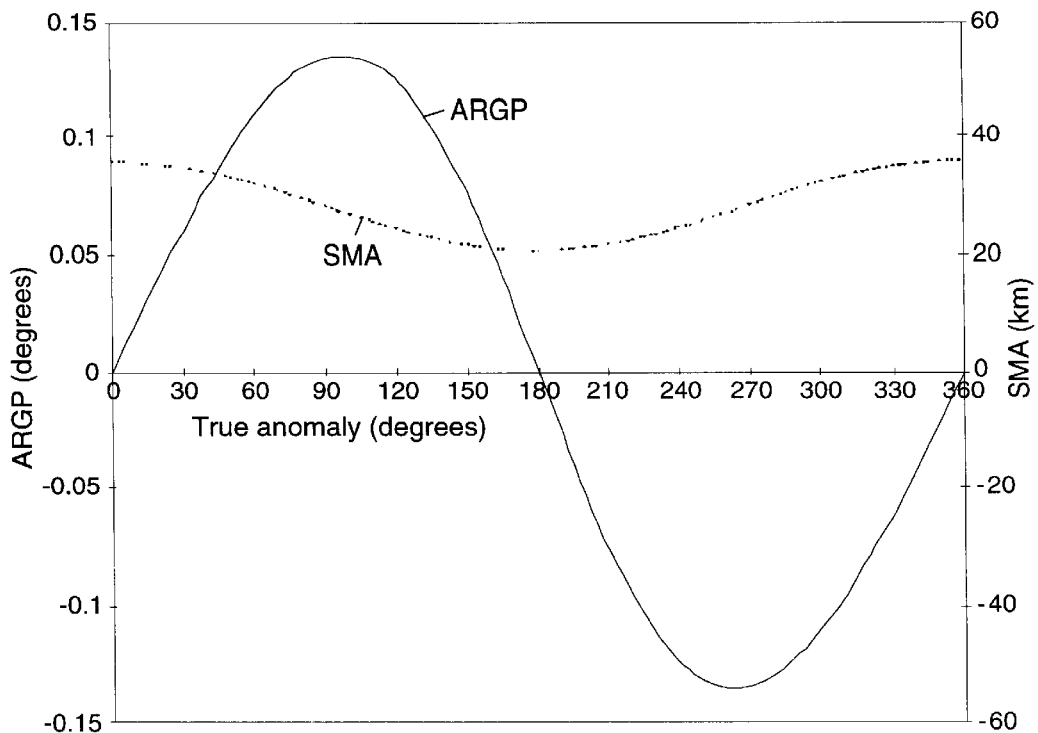
FIG. 1 is a plot that illustrates argument of perigee and semimajor axis change for 1 m/s in-plane $\Delta V$s.

The primary requirements on orbital elements and stationkeeping tolerances for satellites located in an inclined, eccentric geosynchronous orbit are defined in a specification developed by the assignee of the present invention. For proper constellation performance, each satellite's orbit must be maintained within the tolerances shown in Table 1 below.

TABLE 1

Orbit parameters and tolerances

| Parameter | Value | Tolerance |
| --- | --- | --- |
| Semi-major axis | 42,164.2 | — |
| Eccentricity | 0.27 | ±0.005 |
| Inclination | 63.4 | ±5.0° |
| Argument of perigee | 270 | ±5.0° |

The derived requirements are used to provide operational guidelines and to ensure the safety of the satellite. Derived requirements are as follows: (1) do not perform maneuvers during eclipses and (2) minimize the number of maneuvers performed during orbits in which eclipses also occur.

Certain constraints are present in attempting to control the satellite maneuvers. A first relates to propellant management devices. The propellant management device provides propellant to the thrusters during on-orbit maneuvers. If the propellant management device is completely drained during a stationkeeping maneuver, it will no longer function. Therefore, a time limit of 5 minutes is placed on on-orbit stationkeeping maneuvers (based on two thrusters, steady state). It takes 30 minutes for the sponge to refill to support another maneuver.

A second relates to eclipses. Eclipses will only occur when the beta angle is between ±11°. Therefore, eclipse seasons will always occur during orbit normal attitude control periods. The varying orbit right ascension of the ascending nodes (RAANs) and the high inclination of the orbit allows the eclipse seasons to occur at any time of the year. The eclipse seasons can last anywhere from 20 to 30 days depending on the RAAN.

Eclipses will occur no further south along the orbit than about 2 hours below the equator on either side, and no further north than about 2.5 hours above the equator on either side. The maximum eclipse duration will be about 79–80 minutes. The longer eclipses occur when the shadow is above the equator, because the farther away from perigee the spacecraft gets, the slower it moves, and the longer it takes to get through the earth's shadow.

The satellite stationkeeping operations concept implemented by the present invention is as follows. The satellite stationkeeping strategy calls for 4.5 to 5 months of drifting only allowing for semimajor axis correction during the period when the satellite is yaw steering. During this time, the argument of perigee, eccentricity, and RAAN all accumulate significant variations that will need to be corrected.

The large orbit parameter variations require large $\Delta$Vs (velocity changes) to correct them. The cumulative $\Delta$V required frequently violates the allowable propellant management device thruster on-time constraint. In order to execute the required $\Delta$V, a multiple maneuver sequence must be performed before the required correction is completed.

There is also the derived requirement of not performing maneuvers during an eclipse and minimizing maneuvers during orbits with an eclipse. Eclipses begin when the beta angle reaches ±11° leaving a window before and after the eclipse period to perform maneuvers without threat of an eclipse.

Large in plane (LIP) maneuvers are required to correct the argument of perigee, eccentricity and semimajor axis. The large required $\Delta$Vs will frequently require a multiple maneuver sequence to correct these orbit parameters. Due to primarily solar and lunar effect, the argument of perigee requires a much larger correction $\Delta$V when compared to the eccentricity or the semimajor axis. However, any in plane $\Delta$V will change the semimajor axis creating an undesired apogee longitude drift. In addition, because the $\Delta$V is so large, the drift rate can be as much as 1.5°/day and would result in the apogee longitude deadband being exceeded.

To combat the large drift rates inherent in large in plane maneuvers, a maneuver pairing strategy was devised. The apogee longitude deadband is ±0.5°, or 1° wide. FIG. 1 is a plot that illustrates argument of perigee and semimajor axis change for 1 m/s in-plane $\Delta$Vs.

FIG. 1 shows how the polarity of the argument of perigee change is a function of orbit position while the polarity of semimajor axis change is not. Therefore, performing maneuver pairs on opposite sides of the orbit, with opposing $\Delta$V polarities, allows for the high drift rate caused by the first maneuver to be canceled out by the second maneuver.

By way of example, a +1 m/s $\Delta$V performed at a true anomaly of 90° will accomplish +0.13° of argument of perigee rotation and 30 km of semimajor axis growth. A second maneuver performed half a revolution later at 270° with a magnitude of −1 m/s will also rotate argument of perigee +0.130°, but it will shrink the semimajor axis by 30 km, thus returning the semimajor axis to it pre-maneuver state and canceling any drift rate. However, during the half revolution between maneuvers, the orbit will be drifting rapidly. The maneuver planner must consider the initial sub-satellite longitude, the available deadband, and the desired time between maneuvers when calculating the maneuver magnitudes so as to not exceed the deadband.

Large in plane maneuvers can occur at any point in the orbit. This has serious ramifications during the eclipse seasons. If a large in plane pair is to be performed near the node crossing during eclipse season, there is a high probability that one of the two maneuver positions would be in eclipse, violating the first derived requirement. To eliminate this possibility all large in plane maneuvers must be performed in the period before or after the eclipse season, thus limiting the allowable time to complete the total in-plane $\Delta$V.

The eclipse season also places a time constraint on performance of these maneuvers. Based on a scenario of three large in plane maneuver pairs and 8 days total non-eclipse time in which to perform the maneuvers, a spacing of 0.5 revolutions between maneuvers within a pair, and a spacing of 1.5 revolutions between maneuver pairs is recommended. This spacing allows significant argument of perigee correction while controlling the drift rates and apogee longitude, while allowing sufficient time for orbit determination and replanning prior to the beginning of the next maneuver pair. During actual operations however, it will be up to the maneuver planner's discretion to allow for more time between maneuvers or maneuver pairs, or reducing the incremental $\Delta$V by adding more maneuvers if it is possible.

It was determined that when a large correction of argument of perigee is required (more than 1°), executing the entire correction with only two large large in-plane maneuvers may result in apogee longitude variations of up to 4° or more, not to mention violation of the propellant management device constraint. If maneuvers are decreased in size to less than 5 m/s by increasing the number of maneuvers, the propellant management device constraint will be satisfied, and it will be possible to control apogee longitude variation at least to within ±1° of nominal value through timing and placement of the large in-plane maneuvers. In general, the more maneuvers one is willing to perform, the smaller the variation in apogee longitude. However, the larger number of maneuvers will require a longer time period for execution, possibly averaging one week and approaching 10–12 days at the worst case (for ±1° variation).

Apogee longitude will now be discussed. The pertinent stationkeeping parameter for geostationary satellites is station longitude, a useful concept for a satellite that appears unmoving in the sky, but rather meaningless for a satellite with a ground track that covers much of one hemisphere. However, it is important that the ground track is centered over the desired location. A parameter used to define this center is apogee longitude. The apogee point is at the very top of the ground track (when argument of perigee is the nominal 270°).

The value of the apogee longitude is effected by a number of things. Most simply, a change in the semi-major axis will change the period of the orbit. When the satellite orbit period differs from the earth rotational period, the satellite and Earth are no longer in synchronization, and the apogee longitude will begin to drift either eastward (smaller semi-major axis), or westward (larger semi-major axis). A change in semi-major axis does not immediately change the absolute apogee longitude, but it sets up a non-zero drift so that the apogee longitude will change over time.

Any shift in argument of perigee will cause a corresponding jump in the absolute apogee longitude. A slow argument of perigee change over time caused by orbital perturbations can be countered by stationkeeping maneuvers which change the semi-major axis, and hence the orbital period, to compensate. However, argument of perigee shift caused by stationkeeping maneuvers represents a rotation of the orbit in the orbit plane, and will cause a corresponding shift in apogee longitude. The relative factor is about 2.22° apogee longitude for each 1° of argument of perigee change, as shown in Table 2. An increase in argument of perigee causes an eastward movement of apogee longitude, while a decrease causes a westward movement.

TABLE 2

Apogee longitude variation with argument of perigee

| Arg of Perigee (°) | Apogee Long (° E) | ΔApogee Long (° E) |
|---|---|---|
| Nominal | −96.00 | — |
| +2 | −91.55 | +4.45 |
| +4 | −87.14 | +8.86 |
| −2 | −100.46 | −4.46 |
| −4 | −104.89 | −8.89 |

An example of a stationkeeping maneuver sequence without consideration for apogee longitude is shown in Table 3 (shown in FIG. 2 of the drawing figures). Looking at the "before" and "after" maneuver orbit elements, the effects of each maneuver can be seen. The two large in-plane maneuvers occur on opposite sides of the orbit at true anomalies of about 289° and 122°, and apply ΔV in-plane. They both increase the argument of perigee significantly, by greater than 1° each. The first large in-plane maneuver decreases send-major axis by 294 km, resulting in a westward apogee longitude drift rate of 3.7°/day. However, the second large in-plane maneuver occurs only 9 hours later, before the spacecraft has even reached apogee again. The second large in-plane maneuver increases semi-major axis by 302 km, returning it to near its nominal value.

The major contributions to the variations in apogee longitude are the change in argument of perigee caused by the two large in-plane maneuvers at the conversion factor of 2.22:1 based upon the data in Table 2, along with an apogee longitude drift rate of −3.7°/day for the 9 hours between LIP1 and LIP2. These effects combine as shown in Table 4:

TABLE 4

Apogee longitude changes during maneuver period

| Cause | Effect on apogee longitude |
|---|---|
| LIP 1: Δarg per = 1.142° | +2.54° E |
| LIP 1 to LIP 2 drift rate | −1.39° E |
| LIP 2: Δarg per = 1.520° | +3.37° E |
| TOTAL | +4.52° E |

From the results in Table 4, we can begin to see the consequences of certain types of maneuvers and orbit changes, and devise a modified strategy which will achieve the desired stationkeeping goals while maintaining the apogee longitude at least close to the desired value throughout the maneuver sequence (−96°E for this example). The first key factor is to decrease the size and increase the number of the large in-plane maneuvers. It is impossible to maintain a low apogee longitude error when it changes by more than 2° with a single maneuver. This strategy is also necessary to satisfy the propellant management device constraint, so it is possible that very few additional maneuvers will be required specifically for apogee longitude control.

At the beginning of this example, the apogee longitude is −96.8°, already farther west than desired. Therefore, it is preferable to have the first large in-plane maneuver apply a negative ΔV, to decrease the semi-major axis and provide a drift rate toward the East. The positive change in argument of perigee will also provide a jump in apogee longitude toward the East. The large in-plane maneuvers will then alternate between positive and negative ΔV, always increasing argument of perigee, but alternating between increasing and decreasing semi-major axis to minimize change in apogee longitude.

The locations of the large in-plane maneuvers in terms of orbital true anomaly are unchanged from Table 4. The first large in-plane maneuver is sized so that apogee longitude moves East, but stays within 1° of the nominal longitude of −96°E. The remaining maneuvers are designed with the same philosophy, to alternate variation in apogee longitude but remain within 1° of nominal.

The rule of thumb for timing between stationkeeping maneuvers is generally about one day, to allow time for orbit determination, maneuver planning, and crew rest. In some cases, when maneuvers occur on different sides of the orbit, the maneuvers would actually be 1.5–2 days apart to satisfy a minimum of at least one day. Since some satellites' maneuver sequences need to be split into potentially large numbers of burns, requiring a day or more between all maneuvers would result in sequences requiring long periods of time, possibly weeks. In order to try to minimize the total time period as much as possible, it was decided to perform the large in-plane maneuvers in pairs, one on each side of the orbit. Then a period of about 1.5 days passes before the next pair of large in-plane maneuvers, or the following maneuver. This strategy saves about 1 day per pair of large in-plane maneuvers.

The final modified sequence of maneuvers chosen is shown in Table 5. For each maneuver, Table 5 lists the date and time of occurrence, the true anomaly location, the ΔV applied, and the apogee longitude which will occur at the following one or two apogee passages, prior to the next maneuver. The dashes for apogee longitude following 2A, 2B, and 2C indicate that the next maneuver occurs prior to the spacecraft reaching the next apogee. It can be seen that the apogee longitude jumps East to around −95.5° following each pair of LIP 2X/ LIP 1X maneuvers, then drifts west to about −96.5° before the next pair is performed.

TABLE 5

Stationkeeping maneuvers chosen to improve results

| MNVR | DATE | TIME | TRUE ANOM (°) | ΔV (M/S) | NEXT APO LONG (° E) |
|---|---|---|---|---|---|
| LIP 2A | 3/01/02 | 21:01:55 | 288.9 | −2.00 | — |
| LIP 1A | 3/02/02 | 6:02:16 | 121.6 | 5.00 | −95.76 |
|  |  |  |  |  | −96.56 |
| LIP 2B | 3/03/02 | 21:00:18 | 288.9 | −3.50 | — |
| LIP 1B | 3/04/02 | 6:03:16 | 121.6 | 4.00 | −95.66 |
|  |  |  |  |  | −96.32 |
| LIP 2C | 3/05/02 | 20:58:11 | 288.9 | −3.50 | — |
| LIP 1C | 3/06/02 | 6:02:37 | 121.6 | 3.90 | −95.27 |

The maneuver sequence shown in Table 5 achieves very nearly the same argument of perigee change as in Table 3. At the same time, the apogee longitude is kept within ±1° of nominal throughout the sequence.

Figure 3:
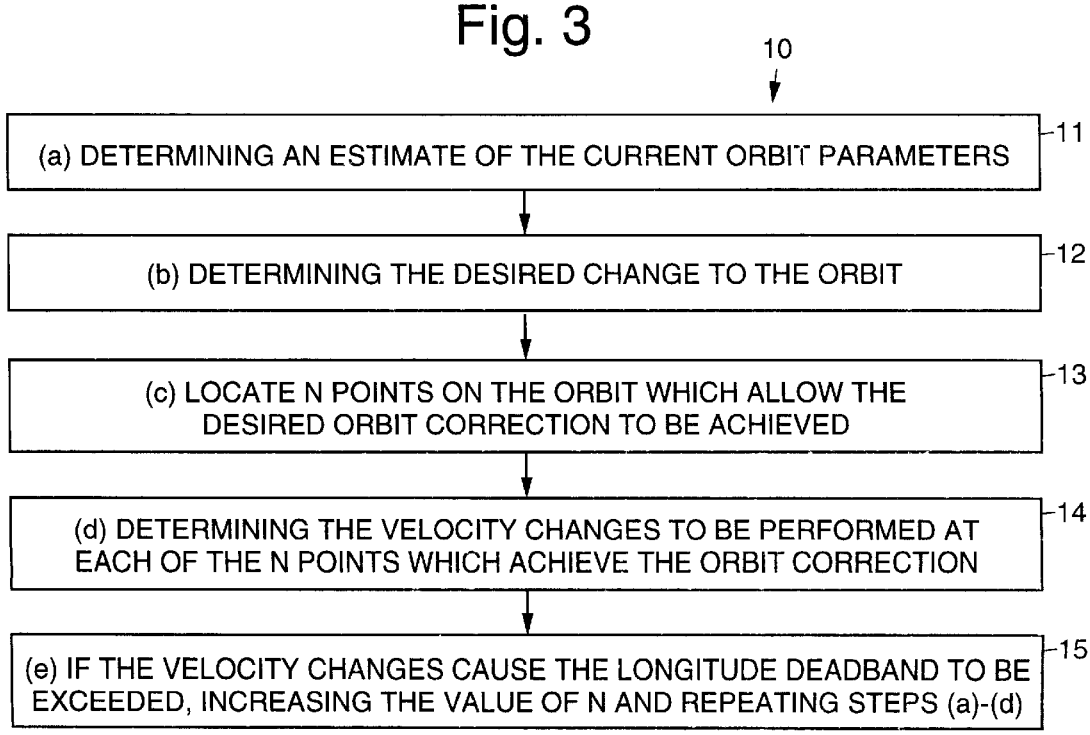

With the above in mind and referring to FIGS. 3 and 4, details of exemplary methods 10 in accordance with the principles the present invention will be discussed. FIG. 3 illustrates a first exemplary method for controlling the longitude of a reference point of an inclined, eccentric spacecraft orbit. Referring to FIG. 3, a first embodiment of the method 10 comprises the following steps.

An estimate of the current orbit parameters is determined 11. The desired change to the orbit is determined 12. N points on the orbit are located 13 which allow the desired orbit correction to be achieved. The velocity changes to be performed at each of the N points which achieve the orbit correction is determined 14. If the velocity changes cause the longitude deadband to be exceeded, the method 10 further comprises the step of increasing 15 the value of N and repeating the above steps.

In the present method 10, the orbit has a period of substantially one day, or the orbit has a substantially repeating ground track. This would include spacecraft performing an integer number of revolutions per day. The reference point may be the sub-satellite longitude at the instant the satellite is at any given true anomaly between 0° and 360° (e.g., perigee or apogee). The reference point may also be a sub-satellite longitude at the instant the satellite is at any given argument of latitude between 0° and 360° (e.g., ascending node). The number of orbits allowed between the two maneuvers in a given pair may be selectable (which impacts the allowable velocity change). The orbit inclination is preferably greater than 7 degrees.

Referring to FIG. 4, it is a flow chart that illustrates a more detailed second embodiment of the present method 10. The second embodiment of the method 10 comprises the following steps.

Necessary changes to argument of perigee ($\omega_p$) and semi-major axis (a) are determined 11. Two points on the orbit that will allow both parameters to be corrected with the minimum total $\Delta v$ are located 13 using the following relationships:

$$\Delta \omega_p = \frac{-\sqrt{1-e^2}}{nae}\left(1 + \frac{r\sin\theta}{a(1-e^2)}\right)\Delta v \; ;$$

$$\Delta a = \frac{2a\sqrt{1-e^2}}{nr}\Delta v$$

Which $\Delta v$ will be performed first is then determined 14. If a $\Delta v$ causes an instantaneous shift in the longitude of the reference point chosen (e.g., apogee), the $\Delta v$ that causes this point to shift opposite the direction the point will drift would typically be performed first. If the resulting $\Delta v$'s ($\Delta v_P$ and $\Delta v_Q$) do not need to be split up, the method 10 skips 15 to the final step.

How many parts to divide each $\Delta v$ into is determined 21 (the same number of parts for each $\Delta v$). How often to do maneuvers is then determined 22. Typically pairs of $\Delta v$'s are performed on the same orbit, followed by at least one full orbit with no maneuvers for orbit determination.

Maneuvers (i.e., velocity changes) are determined 14 such as by using the following equations:

$$p_1 = q_n = \frac{1}{n} - z; \; p_n = q_1 = \frac{1}{n} + z; \text{ all other } p_i, q_i = \frac{1}{n} \; (i = 2, \ldots, n-1),$$

where $p_i$=fraction of $\Delta v_P$ on $i^{th}$ part ($\Delta v_{Pi}$ divided by total $\Delta v_P$),
$q_i$=fraction of $\Delta v_Q$ on $i^{th}$ part,
n=number of parts, $$z = \frac{\frac{|\lambda|}{|\Delta v_P|}\Delta v_P + \frac{|\lambda|}{|\Delta v_Q|}\Delta v_Q + \frac{|\lambda|}{|\Delta v_P|}\Delta v_{PI} - \Delta\lambda}{(n-1)\frac{|\lambda|}{|\Delta v_P|}\Delta v_P T},$$

$\lambda$=longitude of the reference point, $\frac{|\lambda|}{|\Delta v_P|}\Delta v_P$ = instantaneous change in $\lambda$ due to $\Delta v_P$, $\frac{|\lambda|}{|\Delta v_P|}\Delta v_P$ = instantaneous change in the rate of change of $\lambda$ due to $\Delta v_P$, $\Delta\lambda$=desired change in $\lambda$,
t=time between $\Delta v_P$ and $\Delta v_Q$ of a given pair,
T=time between consecutive parts of $\Delta v_P$ which is an integer multiple of the orbital period, and wherein the bum magnitudes become: $p_i\Delta v_P$ and $q_i\Delta v_Q$ for the $i^{th}$ pair;

Then, it is determined 23 if $\lambda$ is unacceptable at any point in this plan. If the longitude of the reference point is unacceptable, the bums are split (divided) into more parts, and how many parts to divide each $\Delta v$ into is again determined 21 and the method 10 continues, or the times between burns are changed and how often to do maneuvers is again determined 22 and the method 10 continues.

Finally, how far the longitude of the reference point moves is determined 25 and the last bum is increased or decreased accordingly to cause the reference point to slowly drift back to the desired location over a period of time.

Thus, methods for controlling the orbit of an inclined, eccentric, geosynchronously orbiting satellite have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for controlling the longitude of a reference point of an inclined, eccentric spacecraft orbit, comprising the steps of:
  (a) determining an estimate of current orbit parameters;
  (b) determining a desired change to the orbit;
  (c) locate N points on the orbit which allow a desired orbit correction to be achieved;
  (d) determining velocity changes to be performed at each of the N points which achieve the desired orbit correction; and
  (e) if the velocity changes cause a longitude deadband to be exceeded, increasing the value of N and repeating steps (a)–(d).

2. The method recited in claim 1 wherein the orbit has a period of substantially one day.

3. The method recited in claim 1 wherein the orbit has substantially repeating ground track.

4. The method recited in claim 1 wherein the reference point may be the sub-satellite longitude at the instant the satellite is at any given true anomaly between 0° and 360°.

5. The method recited in claim 1 wherein the reference point may be the sub-satellite longitude at the instant the satellite is at any given argument of latitude between 0° and 360°.

6. The method recited in claim 1 wherein the number of orbits allowed between maneuvers is selectable.

7. The method recited in claim 1 wherein the orbit inclination is greater than 7 degrees.

8. The method recited in claim 1 wherein the orbit has a period of substantially one day, inclination greater than 7 degrees, and the reference point is the sub-satellite longitude at the instant the satellite is at apogee.

9. The method recited in claim 1 wherein the orbit has a period of substantially one day, an inclination greater than 7 degrees, and the reference point is the sub-satellite longitude at the instant the satellite is at the ascending node.

10. The method recited in claim 1 wherein the orbit correction plan is only partially completed before additional orbit determination and replanning is performed.

11. A method for controlling the longitude of a reference point of an inclined, eccentric spacecraft orbit, comprising the steps of:
 (a) determining an estimate of current orbit parameters;
 (b) determining a desired change to the orbit;
 (c) locate one pair of points on the orbit which allow a desired orbit correction to be achieved;
 (d) determining velocity changes to be performed at each of the points which achieve the desired orbit correction;
 (e) if the velocity changes cause a longitude deadband to be exceeded, increase the number of pairs of points and repeat steps (a)–(d); and
 (f) if the velocity changes cause the longitude deadband to be exceeded, repeat step (d) for N sets of points.

12. The method recited in claim 11 wherein the orbit has a period of substantially one day.

13. The method recited in claim 11 wherein the orbit has substantially repeating ground track.

14. The method recited in claim 11 wherein the reference point may be the sub-satellite longitude at the instant the satellite is at any given true anomaly between 0° and 360°.

15. The method recited in claim 11 wherein the reference point may be the sub-satellite longitude at the instant the satellite is at any given argument of latitude between 0° and 360°.

16. The method recited in claim 11 wherein the number of orbits allowed between the two maneuvers in a given pair is selectable.

17. The method recited in claim 11 wherein the orbit inclination is greater than 7 degrees.

18. The method recited in claim 11 wherein the orbit has a period of substantially one day, inclination greater than 7 degrees, and the reference point is the sub-satellite longitude at the instant the satellite is at apogee.

19. The method recited in claim 11 wherein the orbit has a period of substantially one day, an inclination greater than 7 degrees, and the reference point is the sub-satellite longitude at the instant the satellite is at the ascending node.

20. The method recited in claim 11 wherein the orbit correction plan is only partially completed before additional orbit determination and replanning is performed.

21. A method for controlling the longitude of a reference point of an inclined, eccentric spacecraft orbit, comprising the steps of:
 (a) determining necessary changes to argument of perigee and semi-major axis;
 (b) locating two points on the orbit that will allow the argument of perigee and semi-major axis to be corrected with a minimum total $\Delta v$;
 (c) determining which $\Delta v$ will be performed first;
 (d) skipping to a final step if the resulting $\Delta v$'s do not need to be split up;
 (e) determining how many parts to divide each $\Delta v$ into;
 (f) determining how often to do maneuvers;
 (g) performing the maneuvers;
 (h) determining if a longitude of a reference point is unacceptable at any point in this plan, and if so, returning to step (e) and split burns into more parts, or return to step (f) and change times between burns; and
 (i) determining how far the longitude of the reference point moves and increasing or decreasing a last burn accordingly to cause the reference point to slowly drift back to a desired location over a period of time.

22. The method recited in claim 21 wherein the maneuvers are determined by the equations:

$$p_1 = q_n = \frac{1}{n} - z;\ p_n = q_1 = \frac{1}{n} + z;\ \text{all other } p_i, q_i = \frac{1}{n}\ (i = 2, \ldots, n-1)$$

where $p_i$=fraction of $\Delta v_P$ on $i^{th}$ part ($\Delta vP_i$ divided by total $\Delta v_P$), $q_i$=fraction of $\Delta vQ$ on $i^{th}$ part, n=number of parts, $$z = \frac{\frac{|\lambda}{|\Delta v_P}\Delta v_P + \frac{|\lambda}{|\Delta v_Q}\Delta v_Q + \frac{|\lambda}{|\Delta v_P}\Delta v_P t - \Delta\lambda}{(n-1)\frac{|\lambda}{|\Delta v_P}\Delta v_P T},$$

$\lambda$=longitude of the reference point, $$\frac{|\lambda}{|\Delta v_P}\Delta v_P = \text{instantaneous change in } \lambda \text{ due to } \Delta v_P,$$

$$\frac{|\dot\lambda}{|\Delta v_P}\Delta v_P = \text{instantaneous change in the rate of change of } \lambda \text{ due to } \Delta v_P,$$

$\Delta\lambda$=desired change in $\lambda$, t=time between $\Delta v_P$ and $\Delta v_Q$ of a given pair, T=time between consecutive parts of $\Delta v_P$ which is an integer multiple of the orbital period.

23. The method recited in claim 21 wherein the step of locating the two points on the orbit that will allow the argument of perigee ($\omega_p$) and semi-major axis (a) to be corrected with the minimum total $\Delta v$ is performed using the relationships:

$$\Delta\omega_p = \frac{-\sqrt{1-e^2}}{nae}\left(1 + \frac{r\sin\theta}{a(1-e^2)}\right)\Delta v$$

$$\Delta a = \frac{2a\sqrt{1-e^2}}{nr}\Delta v$$

24. The method recited in claim 21 wherein the orbit correction plan is only partially completed before additional orbit determination and replanning is performed.

* * * * *